US011263906B2

(12) United States Patent
Humphreys et al.

(10) Patent No.: US 11,263,906 B2
(45) Date of Patent: *Mar. 1, 2022

(54) AUTOMOTIVE VEHICLE PARKING SYSTEMS, METHODS, AND APPARATUS

(71) Applicants: Evan Humphreys, Los Angeles, CA (US); Denise Lisa Salvucci, Corona Del Mar, CA (US); Michael J. Kline, Corona Del Mar, CA (US)

(72) Inventors: Evan Humphreys, Los Angeles, CA (US); Denise Lisa Salvucci, Corona Del Mar, CA (US); Michael J. Kline, Corona Del Mar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/899,673

(22) Filed: Jun. 12, 2020

(65) Prior Publication Data

US 2020/0302790 A1 Sep. 24, 2020

Related U.S. Application Data

(63) Continuation of application No. 16/103,225, filed on Aug. 14, 2018, now Pat. No. 10,692,374.

(60) Provisional application No. 62/550,429, filed on Aug. 25, 2017.

(51) Int. Cl.
*B60Q 1/48* (2006.01)
*G08G 1/14* (2006.01)
*G07F 17/24* (2006.01)
*G06Q 20/34* (2012.01)

(52) U.S. Cl.
CPC ............ *G08G 1/146* (2013.01); *G07F 17/24* (2013.01); *G08G 1/141* (2013.01); *G08G 1/143* (2013.01); *G08G 1/144* (2013.01); *G06Q 20/341* (2013.01); *G06Q 2240/00* (2013.01)

(58) Field of Classification Search
CPC ........ G08G 1/146; G08G 1/141; G08G 1/143; G08G 1/144; G07F 17/24; G06Q 20/341; G06Q 2240/00
USPC ...................................................... 340/932.2
See application file for complete search history.

(56) References Cited

U.S. PATENT DOCUMENTS

| 5,910,782 A | 6/1999 | Schmitt et al. |
| 7,104,447 B1 | 9/2006 | Lopez et al. |
| 9,230,292 B2 | 1/2016 | Amin et al. |
| 9,275,546 B2 * | 3/2016 | Aravkin .................. G08G 1/14 |
| 9,418,552 B2 * | 8/2016 | Korman ................ G08G 1/144 |

(Continued)

*Primary Examiner* — Kerri L McNally
*Assistant Examiner* — Thang D Tran
(74) *Attorney, Agent, or Firm* — BakerHostetler (57) ABSTRACT

Systems, methods, and apparatuses for locating parking spaces are disclosed. According to one method, a request is received from a user of a vehicle to locate a space; the location of the user is determined; a database comprising spaces within a geographic region is accessed; from the database, a subset of spaces within the geographic region is identified, the subset comprising user-specific spaces; a determination is made regarding the availability of the user-specific spaces; and if a user-specific space is available, a transmission is initiated, intended for the user, providing the location of at least one available space. The systems, methods, and apparatus may be used to locate free spaces, may allow users to indicate when they are vacating a space to enable other users to access the space via a "park it forward" approach, and may assign available spaces to users based on an equitable prioritization protocol.

19 Claims, 2 Drawing Sheets

(56) References Cited

U.S. PATENT DOCUMENTS

| | | | |
|---|---|---|---|
| 9,418,553 B2 | 8/2016 | Nakhjavani | |
| 9,747,797 B1* | 8/2017 | Ghosh | G08G 1/143 |
| 9,747,798 B2* | 8/2017 | Moise | G08G 1/147 |
| 9,984,572 B1* | 5/2018 | Newman | G06K 9/00812 |
| 10,373,396 B2* | 8/2019 | Tomer | G07B 15/00 |
| 2006/0250277 A1 | 11/2006 | Colak | |
| 2007/0040701 A1* | 2/2007 | Browne | G08G 1/14 |
| | | | 340/932.2 |
| 2007/0100700 A1 | 5/2007 | Mandy | |
| 2009/0237413 A1* | 9/2009 | Ogawa | G01C 21/3605 |
| | | | 345/548 |
| 2010/0026522 A1 | 2/2010 | Ward | |
| 2010/0052946 A1 | 3/2010 | Levine et al. | |
| 2010/0268571 A1 | 10/2010 | Davies et al. | |
| 2010/0302068 A1* | 12/2010 | Bandukwala | G08G 1/14 |
| | | | 340/932.2 |
| 2011/0133957 A1* | 6/2011 | Harbach | G08G 1/14 |
| | | | 340/932.2 |
| 2011/0143779 A1 | 6/2011 | Rowe et al. | |
| 2012/0056758 A1* | 3/2012 | Kuhlman | G08G 1/14 |
| | | | 340/932.2 |
| 2012/0095790 A1* | 4/2012 | Stefik | G07B 15/02 |
| | | | 705/5 |
| 2012/0095791 A1 | 4/2012 | Stefik et al. | |
| 2012/0265434 A1* | 10/2012 | Woodard | G08G 1/147 |
| | | | 701/423 |
| 2012/0285790 A1 | 11/2012 | Jones et al. | |
| 2012/0286972 A1 | 11/2012 | Bouzaglo | |
| 2012/0323643 A1 | 12/2012 | Volz | |
| 2013/0132140 A1 | 5/2013 | Amin et al. | |
| 2013/0135118 A1* | 5/2013 | Ricci | G06N 5/02 |
| | | | 340/932.2 |
| 2013/0288692 A1 | 10/2013 | Dupray et al. | |
| 2014/0058711 A1* | 2/2014 | Scofield | G06Q 10/04 |
| | | | 703/6 |
| 2014/0085109 A1 | 3/2014 | Stefik et al. | |
| 2014/0085112 A1* | 3/2014 | Gruteser | B60Q 9/004 |
| | | | 340/932.2 |
| 2014/0176348 A1* | 6/2014 | Acker, Jr | G08G 1/146 |
| | | | 340/932.2 |
| 2014/0266800 A1* | 9/2014 | Koukoumidis | G08G 1/146 |
| | | | 340/932.2 |
| 2014/0320318 A1* | 10/2014 | Victor | G01C 21/3685 |
| | | | 340/932.2 |
| 2014/0335897 A1* | 11/2014 | Clem | G08G 1/147 |
| | | | 455/456.3 |
| 2014/0340240 A1 | 11/2014 | Becker et al. | |
| 2015/0009047 A1* | 1/2015 | Ashkenazi | G08G 1/147 |
| | | | 340/932.2 |
| 2015/0066607 A1* | 3/2015 | Fiorucci | G06Q 30/0205 |
| | | | 705/13 |
| 2015/0091741 A1 | 4/2015 | Stefik et al. | |
| 2015/0123818 A1 | 5/2015 | Sellschopp | |
| 2015/0149263 A1* | 5/2015 | Stenneth | G06Q 20/14 |
| | | | 705/13 |
| 2015/0213716 A1 | 7/2015 | Aggarwal et al. | |
| 2015/0248835 A1* | 9/2015 | Aravkin | G08G 1/146 |
| | | | 340/932.2 |
| 2015/0161564 A1 | 11/2015 | Sweeney et al. | |
| 2015/0369613 A1* | 12/2015 | Stadler | B60R 1/00 |
| | | | 701/537 |
| 2015/0379873 A1 | 12/2015 | Tippelhofer et al. | |
| 2016/0012726 A1* | 1/2016 | Wang | G07B 15/02 |
| | | | 340/932.2 |
| 2016/0063862 A1 | 3/2016 | Rosen | |
| 2016/0117926 A1* | 4/2016 | Akavaram | B60W 40/09 |
| | | | 340/932.2 |
| 2016/0125736 A1* | 5/2016 | Shaik | G08G 1/14 |
| | | | 701/23 |
| 2016/0163197 A1* | 6/2016 | Levy | G08G 1/144 |
| | | | 340/932.2 |
| 2016/0214535 A1* | 7/2016 | Penilla | G06Q 30/00 |
| 2017/0025009 A1* | 1/2017 | Hakeem | G08G 1/144 |
| 2017/0118307 A1 | 4/2017 | Beaurepaire et al. | |
| 2017/0138746 A1* | 5/2017 | Eliassi | G01C 21/3476 |
| 2017/0200320 A1* | 7/2017 | Tomer | G08G 1/147 |
| 2017/0213464 A1* | 7/2017 | Emadi | G06Q 20/20 |
| 2017/0249625 A1* | 8/2017 | Vossoughi | G06Q 20/3223 |
| 2017/0278023 A1* | 9/2017 | Rosen | G08G 1/148 |
| 2017/0323227 A1* | 11/2017 | Sadeghi | G06Q 20/102 |
| 2017/0371608 A1* | 12/2017 | Wasserman | G06Q 30/0261 |
| 2018/0012149 A1* | 1/2018 | Yust | G06Q 20/3224 |
| 2018/0043884 A1 | 2/2018 | Johnson | |
| 2018/0096263 A1* | 4/2018 | Modi | G06Q 10/02 |
| 2018/0150764 A1 | 5/2018 | Stenneth | |
| 2018/0313660 A1* | 11/2018 | Eyster | G01C 21/3685 |
| 2019/0236953 A1* | 8/2019 | Peters | G08G 1/144 |

* cited by examiner

AUTOMOTIVE VEHICLE PARKING SYSTEMS, METHODS, AND APPARATUS

CROSS-REFERENCE TO RELATED APPLICATIONS

This application is a continuation of U.S. patent Ser. No. 16/103,225 filed on Aug. 14, 2018, which claims the benefit of U.S. Provisional Patent Application No. 62/550,429, filed on Aug. 25, 2017, entitled "Automotive Vehicle Parking Systems, Methods and Apparatus," the contents of which are hereby incorporated by reference herein.

BACKGROUND OF THE DISCLOSURE

Parking can be a major inconvenience, particularly for anyone living in cities or other congested areas, particularly at high-traffic times, such as rush hour, meal time, work days, weekends, and holidays, and at high-traffic locations, such as the beach, sporting venues, malls, etc. Drivers can waste huge amounts of time and fuel searching for parking, and are often forced, after expending such time and fuel, to pay exorbitant prices in price-gouging lots. Smartphone applications, such as the "Parkmobile" mobile application, available from Parkmobile USA, Inc., are generally directed to assisting those using the application to expedite payment for parking in paid parking facilities and/or reserving a space in such facilities. But not everyone wants to pay for parking, and not everyone is able to plan in advance to reserve a parking spot. The present disclosure can save drivers time, fuel, and/or money, and can enable cities, towns, and communities to better control their traffic flow and make the best use of available parking locations.

SUMMARY

As disclosed herein, systems, methods, and apparatuses for locating parking spaces are disclosed.

In an aspect, a system is disclosed including a communication device associated with an automotive vehicle, a parking meter associated with a parking space, wherein the communication device is configured to communicate with the parking meter, and a server in communication with the communication device and the parking meter. The parking meter comprises a sensor configured to determine if the parking space is occupied.

In an aspect, a non-transitory computer readable storage medium is disclosed. The non-transitory computer readable storage medium stores instructions that when executed by a processor perform the steps of: receiving a request from a user of a vehicle to locate a free parking space, determine a location of the user, access a database comprising free parking spaces within a geographic region, and identify, from the database of free parking spaces, a subset of free parking spaces within the geographic region, the subset comprising user-specific free parking spaces, determine if any of the user-specific free parking spaces is available, and if a user-specific free parking space is available, initiate a transmission, intended for the user, of a location of at least one available free parking space.

In another aspect, the system may be configured to recognize that an unauthorized vehicle and/or driver that has not joined the system and/or mobile application, has improperly occupied a free space reserved for those who have joined, and may collect data such as license plate information using known imaging apparatus to log the infraction and issue a fine to the driver of the unauthorized vehicle.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter. Furthermore, the claimed subject matter is not limited to implementations that solve any or all disadvantages in any part of this disclosure.

DETAILED DESCRIPTION

Figure 1:
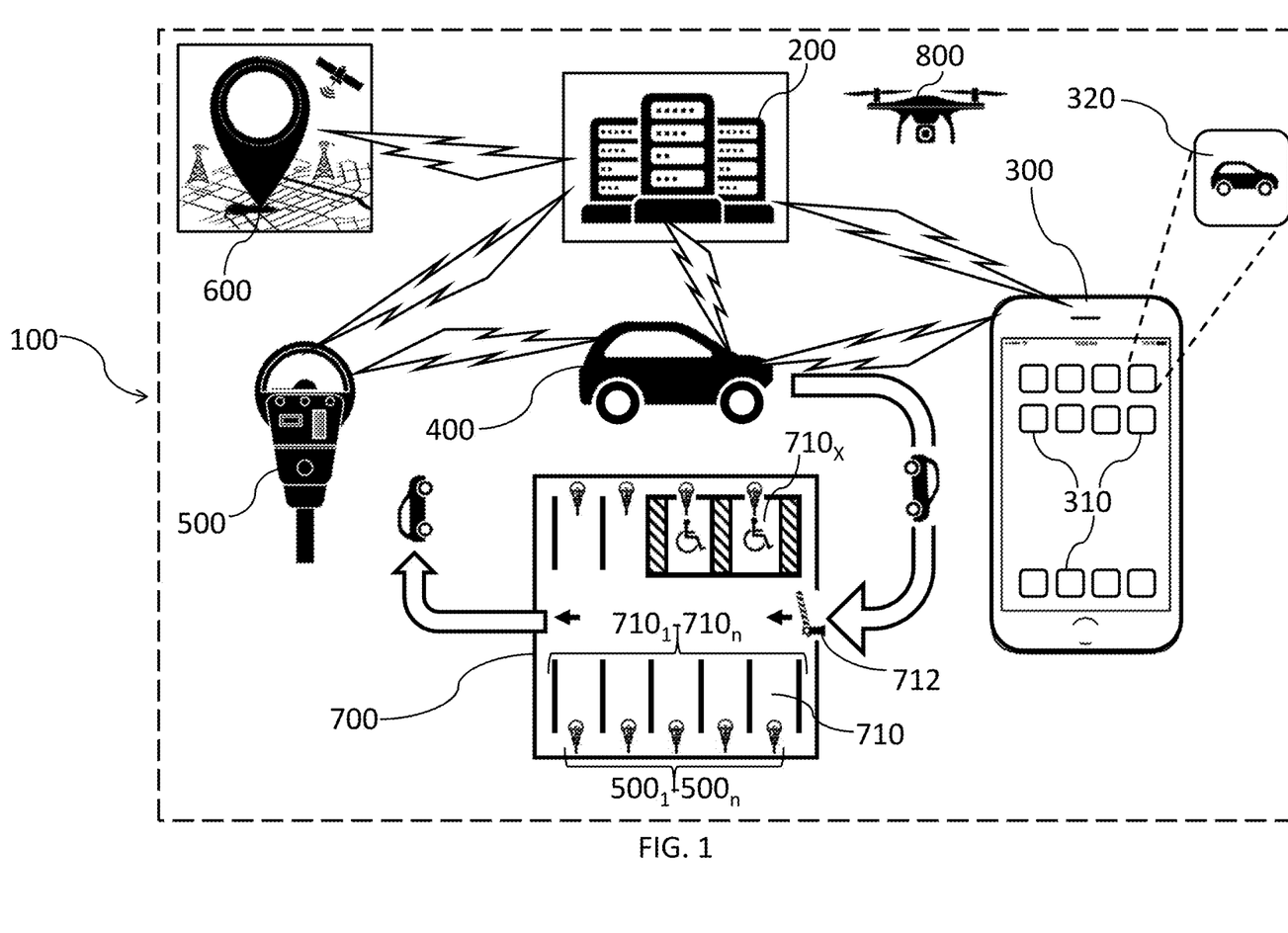
FIG. 1 illustrates a diagram of a system for locating parking spaces.

Referring to FIG. 1, there is illustrated an exemplary system of the present disclosure, generally 100. The system 100 may comprise one or more elements, such as a server or servers 200, which may be remote, a mobile device 300, a vehicle 400, a parking meter 500, a GPS locator 600, a parking area 700, and/or one or more drones 800. Each of these elements 200, 300, 400, 500, 600, 700, and/or 800 may be in communication, such as one-way or two-way wired and/or wireless communication, whether via the internet, satellites, servers, or otherwise, with one or more, or even all, of the other elements 200, 300, 400, 500, 600, 700 and/or 800. As will be subsequently described, these elements 200, 300, 400, 500, 600, 700 and/or 800 may be separate, discrete elements or devices, or one or more of the elements 200, 300, 400, 500, 600, 700 and/or 800 may be combined and configured as a single element or device.

The system 100 may comprise a server or servers 200, which may be in communication with a mobile device 300, such as a smartphone or a heads-up display associated with a user. The mobile device 300 may include one or more applications 310, and may include a mobile application 320.

The server or servers 200 of the system 100 may be configured to include a dynamic database of continuously-updated or periodically-updated available and/or unavailable parking spaces, as will subsequently be described. Such database may be may be updated via various systems, methods, and apparatus, including via one or more drones 800, users of the mobile application 320, mobile device(s) 300, vehicle(s) 400, and/or parking meter(s) 500 associated with the system 100, as will be subsequently described.

The system 100 may include one or more vehicles 400, which may include automobiles, taxis, trucks, motorcycles, bicycles, scooters, Segway® vehicles, airplanes, boats, helicopters, military vehicles, golf carts, and any other vehicle or mode of conveyance that can be parked, and particularly vehicles for which parking in a designated location is desirable.

They system 100 may include one or more parking meters 500, which may be configured with one or more of: a communication system, a power system, a solar panel, a payment system, a sensor device, a display, a printer, and/or other components, as will be subsequently described.

The system 100 may include a GPS locator and/or tracking system 600, which may comprise, for example, one or more satellites, transmitters, receivers, towers, servers, and mobile applications etc., including, but not limited to, Google Maps® and other such devices and systems.

The system 100 may include a parking area 700, which may comprise a single parking space 710, or several such spaces, for example, on a public street, in an open public parking lot, a parking structure, a gated secure parking facility, etc. Although the Figures and examples herein generally illustrate a parking area 700 of the system 100 as a parking lot for vehicles such as cars, this is illustrative only. Unless the parking area 700 is specifically identified or claimed as limited to a land-based area intended for parking street-legal vehicles, it should be understood that the parking area 700 of the system may include any parking area or facility intended to park any type of vehicle, for example, a boat dock for boats, an airport with gates for airplanes, etc.

The parking area 700 may also comprise one or more restricted parking spaces 710x, such as handicap spaces, expectant mother spaces, employee-of-the-month spaces, emergency vehicle spaces, law enforcement spaces, etc. The system 100 may be configured to distinguish between parking spaces 710 that are without parking restrictions, and restricted parking spaces 710x, and determine whether a user requesting a parking space has a status that qualifies for use of a restricted parking space 710x, and if so, communicate the location of available restricted parking spaces 710x, to users of appropriate parking status.

The system 100 may comprise a gated parking facility that may include a gate 712 in communication with the system 100, for example, with wired or wireless communication devices (not shown). The gate 712 may be configured to close when the parking area 700 is full and automatically open when a space 712 becomes available. The gate 712 may operate with a counter mechanism configured to count cars entering the parking area 700, and operate with an exit gate to count cars exiting the parking area 700, to determine, based on the known number of parking spaces in the parking area 700, how many spaces are available. This information may be communicated to users of the mobile application, for example, via the server or servers 200 and/or the user's mobile device, and/or other communication devices disclosed herein.

The system 100 may comprise a mobile application 320 associated with the mobile device 300 and/or in communication with the server or servers 200. The mobile application 320 may be configured to receive from a user, for example, via the mobile device 300, a query, instruction, or other request to locate an available parking space proximate the mobile device 300.

The mobile application 320 may be configured with user-specific parameters or settings that limit the search for available parking spaces. As an example, Google Maps reportedly monitors air quality as part of its street mapping process, and provides air quality data for users of Google Maps to use in order to avoid areas of poor air quality. This air quality monitoring data can be conveniently used according to the present disclosure, permitting a user to specify, as a user-configured parameter, that only parking spaces in locations meeting certain air quality thresholds should be identified. As other examples of user-specific parameters according to the present disclosure, a user may for example, limit parking space searches to: a certain distance from the location of the user; locations that meet certain pre-selected crime and/or safety and/or air quality parameters; restricted parking spaces, such as those designated as handicap spaces; free or pay parking spaces; dollar limits on pay parking spaces, etc. Thus, for example, the system 100 may be configured to receive a query to search, and to search, via the mobile application 320, for available free handicap parking spaces in a designated safe zone within a search radius of 4-blocks from the mobile device 300, the vehicle 400, or other location device associated with the user. Other uses of the system 100 are of course possible and within the scope of this disclosure.

The mobile application 320 may be further configured to alert a user, for example, via the mobile device 300, in response to such query, instruction, or other request to locate an available parking space, as to whether there are available parking spaces proximate the user or the mobile device 300 (for example, within the user's pre-set radius relative to the location of the user or the mobile device). If there are available parking spaces proximate the user or the mobile device, the mobile application may, for example transmit to, or display on, the user's mobile device the location or directions to the available parking space(s). The mobile application 320 may be further configured, if there are no available parking spaces within the user's pre-set radius, to query the user whether expansion of the pre-set radius to a wider search area is desired, or may be configured to notify the user that although no parking spaces are available within the user's pre-set radius (or other user-specific parameters), that available parking spaces outside such radius (or outside other user-specific parameters) have been located, and to communicate the location(s) of such out-of-radius parking spaces. In the above example, if the search by the system 100 reveals that there exists an available parking space within the user-specific parameters of a free space, located within a 4-block radius of the user's location, in a designated safe zone, but it is not a handicap space, and that the only available free handicap space within a 4-block radius of the user's location is not in a designated safe zone, the system 100 may be configured to query the user if either of such non-parameter-meeting spaces is desired, notwithstanding their failure to meet all the user-specific parameters, and if so, the system 100 may be configured to enable the user to select which non-parameter-meeting space is desired.

The system 100 may be further configured with an equitable prioritization system to prioritize requests for available parking spaces, based on one or more of: the time the request was made; how long a user has been waiting for a request to be filled; the proximity of available parking spaces to the user and/or to the mobile device and/or to the mobile application from which the request was made; the estimated arrival time of a vehicle to the available parking spaces; the user's status, for example, whether a doctor, nurse, patient, or visitor to a hospital, etc. The equitable prioritization system may further include a prioritization algorithm configured to perform one or more steps such as to: receive and process all requests, prioritize them, assign a priority sequence to the requests, communicate a priority count (for example "3 requests are ahead of your request") to a mobile application, mobile device, and/or vehicle of each user making the request, reserve a parking space, and/or communicate the location of available parking spaces in order of the priority sequence.

As an example of the prioritization system of the present disclosure, the system 100 may be configured to minimize fuel consumption of those looking for parking spaces within a geographic area, such as city limits, township limits, or other geographic limits. Reports indicate that many congested cities understand that a significant source of their air pollution is attributable to drivers circling and searching for parking. According to one aspect of the prioritization system of the present disclosure, the system may prioritize and direct those searching for parking spaces to paid lots first, to minimize the amount of driving and fuel consumption associated with users seeking free parking spaces.

As another example of the prioritization system of the present disclosure, the system may prioritize requests for, and identification of, parking spaces. Such a prioritization system may establish parking priority based on one or more factors, such as: when a user has made a request for a parking space, how long a user has been searching for a parking space, how close a user is to a parking space, and/or how long the user intends to occupy the parking space, etc. An algorithm may be used to determine such priority and establish it, for example, according to equitable factors and/or fuel saving and/or other factors. An example is illustrated in Table 1. For example, assume that users A, B, and C have been searching for a parking space within a predefined area, for example, a 10-square block of a city. Each of users A, B, and C, use the system 100 to request a parking space, for example, a free parking space in their vicinity. The system 100 may log the requests and identify each user's locations relative to other users seeking parking and/or relative to the closest available free parking space(s). The closest available free parking space may have been identified by virtue of the system 100 being in communication with another user D of the system 100, who has been identified as having vacated a parking space. The system 100 may employ an algorithm to establish priority of users seeking a parking space. One such algorithm, shown for ease of explanation, is Equation 1 below:

Priority Score=100×[Time Searching for Space (minutes)]/[Proximity to Closest Available Space (feet)+10×Expected Time to Occupy Space (minutes)]    Equation 1:

According to the example of Equation 1, three factors are used to establish parking space allocation priority: time a user has been searching for a parking space; the user's proximity to an available parking space, such as the closest available parking space; and the user's expected time to occupy a parking space. Other factors can also be used to determine priority, such as whether the user drives a fuel-efficient or electric vehicle (for example with fuel-efficient or electric vehicles being given priority for free spaces), whether the user has priority status (for example, is handicapped, is a law enforcement officer, medical or EMT personnel, or other public servant), etc.

In the example of Equation 1, priority weighting is given to users who have spent the most time searching for a space, users who are closest to an available parking space, and—to maximize parking space turnover—users who intend to spend the least amount of time parked in the space. Other priority parameters and weighting are of course possible, including, for example, prioritizing users who intend to remain parked in the space the longest time, for example, in a mall or other parking lot proximate shops and restaurants, to incentivize consumer purchasing.

TABLE 1

| User | Time Searching for Space (minutes) | Proximity to Closest Available Space (feet) | Expected Time Space to be Occupied (minutes) | Priority Score based on Algorithm | Priority Rank |
|---|---|---|---|---|---|
| A | 1 | 100 | 10 | 0.5 | 3 |
| B | 15 | 1000 | 180 | 0.54 | 2 |
| C | 6 | 200 | 60 | 0.75 | 1 |

As illustrated by the example of Equation 1 and Table 1, the prioritization system of this example results in user "C" receiving the highest priority rank, even though user "B" has been searching for a space longer, and user "A" is closer to the available space.

The system 100 might be further configured to "waive off" users who happen upon an available space, but who do not have the top priority ranking to take that space. In the example of Table 1, for example, if user "A" happened upon the available space before top priority user "C" acquired it, the system 100 might alert user "A" that the space is taken by a higher priority user, and that they must pass by the space. The system 100 might also impose a fine or penalty on any user that fails to adhere to the prioritization protocols.

The system 100 and/or mobile application 320 may be further configured with a "park it forward" or "take a space, give a space" incentive system that enables and incentivizes cities, towns, local governments, communities, etc., to use or mandate use of, and enables and incentivizes widespread application and use, or even mandated universal application and use of, the system 100 and/or mobile application 320 by drivers and vehicles within their jurisdictions. According to one aspect of the incentive system, users may voluntarily or mandatorily enroll, download, or otherwise join the mobile application 320, for example, as part of applying for or renewing a state-issued driver's license.

The system 100 may further comprise, for example, on or associated with the server or servers 200, a dynamic database of available parking spaces within the relevant area, whether it be a city, town, community, parking facility, etc. When users use the mobile application 320 to find an available space, the system 100 may access the dynamic database to locate, and direct the user to an available space. The system 100 may further be configured to receive information that such space has been taken by the user, and may be configured to update the dynamic database to reflect that the space has been taken by the user, and is no longer available.

The system 100 may be further configured to receive information indicating that the user of the taken space has vacated that space, and may be configured to again update the dynamic database to reflect that the vacated space is again available, and may notify another user who is a member of the mobile application 320 and is looking for a space that a parking space has just become available. Each user who joins the mobile application may, as part of the "take a space, give a space" methodology, also agree to "save a space" for another user, for example, by remaining in the space a certain amount of time before vacating the parking space, so that another user of the mobile application 320 may take that space. Such methodology may be fulfilled by requiring the user to transmit, via the mobile application 320 or mobile device 300, a message indicating that the user is about to, or has just, vacated the parking space.

The vehicle 400 may be a driver-operated or a driverless vehicle. The vehicle 400 may include the mobile device 300 and/or mobile application 320 as a factory-installed or aftermarket-installed component of the vehicle. The vehicle 400 may include a navigation system and/or dash-mounted display in communication with, and/or comprising, the mobile device 300 and/or mobile application 320.

The system 100 may include one or more parking meters 500, illustrated as a plurality of parking meters $500_1$-$500_n$, n the parking area 700 of FIG. 1. As there illustrated, each of the plurality of parking meters $500_1$-$500_n$ may be associated with a corresponding parking space of a plurality of parking spaces, $710_1$-$710_n$. Associating an individual parking meter 500 with each parking space 700 may make it more convenient to identify, locate, and communicate the location of, both taken and available parking spaces 700 to users looking to park a vehicle 400.

Figure 2:
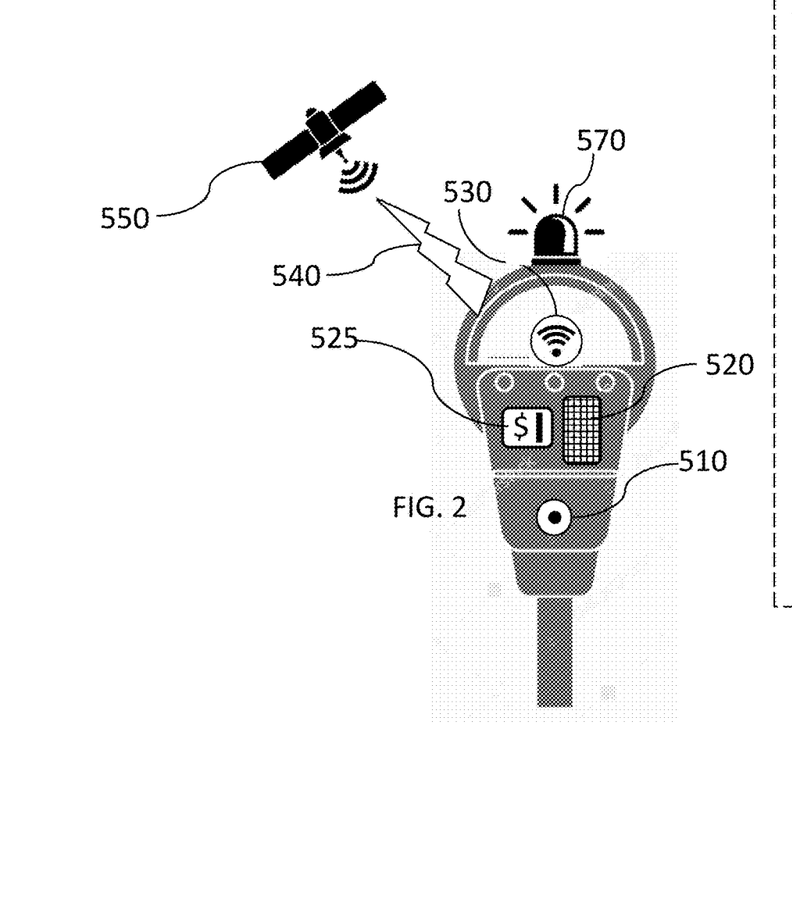
FIG. 2 illustrates a parking meter of the present disclosure.

FIG. 2 illustrates one embodiment of a parking meter 500 of the disclosure in greater detail. In this aspect, the parking meter 500 may comprise one or more sensors 510, configured to detect the presence of a vehicle 400 or the absence thereof, in a parking space 700 with which the parking meter 500 is associated. The sensor(s) 510 may be configured to detect motion, heat, color change, etc., evidencing that a parking space 700 is vacant or occupied. The parking meter 500 may be configured to monitor either free or paid spaces using the sensor(s) 510 to identify when a space associated with the parking meter 500 is occupied and when it is available.

The parking meter 500 may comprise a power source, 520. The power source 520 may be a battery, a solar panel and rechargeable solar cell, or an above-ground or in-ground electrical connection sufficient to power the parking meter 500 to perform the operations disclosed herein.

The parking meter 500 may also comprise a payment system 525, which may be configured to receive payment and/or determine a payment obligation and/or transmit payment data for one or more of: an amount received for use of a parking space 700; a charge owed for use of a parking space 700 and/or an amount billed to a user via a credit card for use of a parking space 700. The payment system 525 may comprise conventional apparatus, such as a credit card or chip reader, a coin or bill slot, a timer mechanism, a receipt printer, etc.

The parking meter 500 may comprise a data communication system 530 configured to enable the parking meter 500 to communicate data 540, such as presence or absence of a vehicle in a parking space 700, such as a parking space 700$_1$ with which a parking meter 500$_1$ is associated; a length of time during which a parking space 700$_1$ has been vacant or occupied by a vehicle 400; frequency of use of the parking space 700$_1$; payment/credit card data specific to a user of the parking space 700$_1$, etc. Such data 540 may be communicated, for example, wirelessly via the communication system 530 to the server or servers 200, the mobile device 300, the vehicle 400, and/or the GPS locator and/or tracking system 600, and/or to or via a drone 800 and/or an in-view satellite 550 for further processing and/or relaying to the system 100.

The parking meter 500 and/or the parking space with which it is associated, and/or the parking space itself, may comprise an indicator 570, which may be a visual indicator such as a light source, an audible indicator such as a speaker system, or other indicator that may be configured to communicate which parking space(s) 700 is available, or which parking space(s) 700 are about to become available, although currently occupied.

In an alternative embodiment of the disclosure, the system 100 may not utilize a dedicated parking meter 500 associated with individual parking spaces 700. In this embodiment, the system 100 may rely upon other apparatus and systems to determine the location of vacant, or available parking spaces, and distinguish them from occupied, or unavailable spaces. In this embodiment, illustrated in FIG. 3, the location and availability of parking spaces 710$_1$-710$_n$ is determined via the presence of vehicles 400$_1$-400$_n$ within a geographic area of interest 720, which may be a parking area 720, or may be an area of interest that is larger than a parking area, such as a city block. As illustrated in this embodiment, parking space numbers 2, 3, 4, 5, 7, and 8 are occupied by vehicles 400. The system 100 may be configured, for example with a server or servers 200 having a database that has stored thereon parking space information for the geographical area of interest 720, for example, information that such area of interest 720 comprises eight parking spaces 710$_1$-710$_8$. As illustrated, each parking space 710 within the area of interest 720 may be numbered, in this case with numbers 1-8. The system 100 may further acquire data indicating that parking space numbers 2, 3, 4, 5, 7, and 8 are occupied by vehicles 400, meaning parking space numbers 1 and 6 are vacant and hence potentially available.

Figure 3:
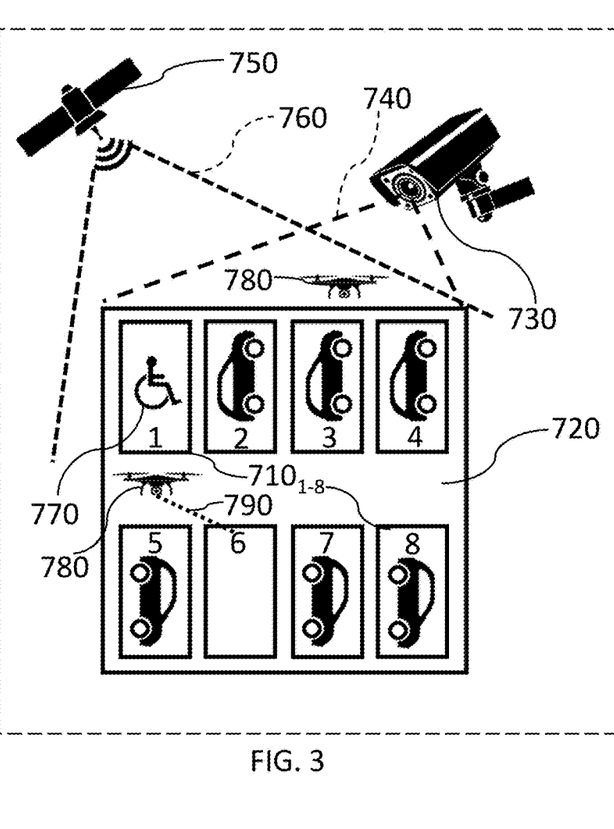
FIG. 3 illustrates a diagram of a system for locating parking spaces.

This data may be determined and transmitted in several different ways. For example, a camera system 730 with a view 740 of the entire geographical area of interest 720 may determine, continuously in real time, or at intervals, the parking space occupancy and vacancy status of each space within the geographical area of interest 720.

As another example, an in-view satellite system 750 having a view 760 of the geographical area of interest 720 may determine, continuously in real time, or at intervals, the parking space occupancy and vacancy status of each parking space within the geographical area of interest 720.

According to another embodiment of the system 100, a drone system 780 comprising one or more drones may use drones as "seekers" to search for, identify, and report, available and/or unavailable parking spaces. Such drones may have or be given access to the geographical area of interest 720, and may be configured with sensors and/or cameras enabling the drone(s) to have a view 790 configured to determine if a parking space 710 is available, in this example, parking space number 6. The drone(s) comprising the drone system 780 may be configured with wireless communication devices, enabling parking space availability status as determined by the drone system 780 to be communicated to one or more of a server or servers 200, a mobile device 300, a mobile application 320, a vehicle 400, a parking meter 500, an indicator 570, and/or a GPS locator 600, for further processing and use by the system 100.

The drone system 780, camera system 730 and in-view satellite system 750 may be used separately or in combination, and may be used in combination with dedicated parking meters 500, or may be advantageously used, for example, when the system 100 has neither dedicated parking meters 500 as described with respect to FIG. 2, nor universal acceptance of the mobile application 320 by all users of the parking spaces within the geographical area of interest 720.

The camera system 730 and/or in-view satellite system 750 and/or drone system 780 may also be advantageously used to identify and distinguish available and unavailable parking spaces, for example, by referring to their space numbers 1-8, and in the example illustrated in FIG. 3, communicating to the system 100 that parking space numbers 1 and 6 are vacant. Such parking space numbers 1-8, or any other icon or signage, etc., that identifies a particular parking space, may be within the camera system 730 view 740, and/or within the in-view satellite system 750 view 760, and/or within the drone system 780 view 790 of the geographical area of interest 720. Such parking space identifiers with respect to such parking spaces may be stored on a database, such as that affiliated with the server or servers 200 of the system 100, and updated periodically as restrictions change, are removed, etc. From this, that spaces 1 and 6 are vacant may be communicated via the system 100 to the user's mobile application 320, smartphone 300, and/or vehicle 400 for use by the user in locating the vacant spaces. But in this example, parking space number 1 is designated as a handicap space; hence, it is vacant, but unavailable to users other than those having handicap status.

The camera system 730 and/or in-view satellite system 750 may also be advantageously used to identify and distinguish vacant spaces 1 and 6 from vacant but restricted or otherwise unavailable spaces, such as space number 1, bearing a handicap icon 770. Such icon 770, or any other icon or signage, etc., that identifies a particular parking space as restricted or unavailable, may be within the camera system 730 view 740, and/or within the in-view satellite system 750 view 760 of the geographical area of interest 720. Such restricted or unavailable parking space identifiers, with respect to such parking spaces, may be stored on a database, such as that affiliated with the server or servers 200 of the system 100, and updated periodically as restrictions change, are removed, etc. From this, that spaces 1 is a restricted, and in this example a designated handicap space, may be communicated via the system 100 to the user's mobile application 320, smartphone 300, and/or vehicle 400 for use by the user in locating, or avoiding, designated handicap or otherwise restricted parking spaces.

In another aspect of the disclosure illustrated in FIG. 3, each of the vehicles 400 parked within the geographical area of interest, and/or each of the mobile devices 300 (not shown) associated with each of the vehicles 400 parked within the geographical area of interest, may be in communication with the system 100, for example, with the server or servers 200, and/or each of the users (not shown) of the vehicles 400 parked within the geographical area of interest 720 may have universally accepted the mobile application 320. In such cases, the location of all the vehicles 400 parked within the geographical area of interest 720 may be determined, and the parking spaces occupied by such vehicles 400 may be determined, either by the location of the vehicles themselves, or by the location of the mobile device associated with such vehicles or the users thereof.

The system 100 may enable determining a location of a user, the user's mobile device, and or mobile application, and enable the user to request on-demand services. For example, the system 100 may enable determining a location related to on-demand services through use of portable computing devices, and/or may enable users to request, and providing users with, on-demand services, for example, substantially as taught and described in U.S. Publication No. US20130132140 A1 and U.S. Pat. No. 9,230,292, respectively, both assigned to Uber Technologies, Inc., and, incorporated in their entireties by reference herein.

The system may also optimize matching of users requesting a parking space to the location(s) of the users relative to the location(s) of available parking spaces. As is known from U.S. Publication No. US 20150161564 A1, entitled "System and Method for Optimizing Selection of Drivers for Transport Requests," assigned to Uber Technologies, Inc., and incorporated in its entirety by reference herein, multiple transport requests can be processed at the same time. A computing system operates to process multiple transport requests at one time, each of the multiple transport requests specifying a pickup location that is within a geographic region. During a given interval when each of the multiple transport requests are open, a pool of candidate drivers is determined within the geographic region that can fulfill one or more of the transport requests within a threshold duration of time. A driver is selected for each of the multiple transport requests. In selecting the driver, the computer system implements an optimization process to minimize an estimated time to pick up for at least one of the multiple transport requests.

Employing the teachings of the present disclosure, the system 100 may comprise a computing system configured to operate to process multiple parking space requests at one time, wherein each of the multiple parking space requests may specify a location that is within a geographic region. During a given interval when each of the multiple parking space requests are open, a pool of candidate parking spaces may be determined within the geographic region that can fulfill one or more of the parking space requests within a threshold duration of time. A parking space, and location therefore, may be selected for each of the multiple parking space requests. In selecting the parking spaces for each request, the computer system may implement an optimization process to minimize an estimated time for each user requesting a parking space to arrive at an available parking space.

We claim:

1. A system comprising: a first communication device associated with an automotive vehicle occupying a free parking space unassociated with any parking meter, the first communication device associated with a first user and comprising a mobile application associated with a plurality of users, the mobile application configured to transmit, via the first communication device, to a remote dynamic database, information indicating that the free parking space unassociated with any parking meter is about to be, or has been, vacated by the automotive vehicle or the first user, the system further configured to transmit, based on a priority, to a second communication device associated with a second user of the plurality of users, information indicating that the free parking space unassociated with any parking meter is about to become or has become available, wherein the priority is based on all of the factors comprising: (1) proximity of the second user to the free parking space unassociated with any parking meter, (2) length of time the second member has been searching for a parking space, and (3) length of time the second member intends to remain parked in the free parking space unassociated with any parking meter, and to transmit information comprising the location of, or directions to, the free parking space unassociated with any parking meter to the second communication device associated with the second user, the system further configured to receive, from the second user, information indicating that the second user intends to occupy, or has occupied, the free parking space unassociated with any parking meter, whereupon the system is configured to update the remote dynamic database to reflect that the free parking space unassociated with any parking meter has been taken, and is no longer available.

2. The system of claim 1, wherein the first user is required to consent, as a condition of accessing and using the mobile application, to transmission of information indicating that the free parking space unassociated with any parking meter is about to be, or has been, vacated by the automotive vehicle or the first user.

3. The system of claim 1, wherein the mobile application is associated with a mobile device associated with the automotive vehicle or the first communication device of the first user.

4. The system of claim 3, wherein the mobile device is selected from a group consisting of a factory-installed device installed in the automotive vehicle, an after-market device installed in the automotive vehicle, a smart phone, and a heads-up display.

5. The system of claim 1, wherein the second communication device is further configured to determine, based on instructions received from the remote dynamic database, the location of the free parking space unassociated with any parking meter.

6. The system of claim 1, wherein the system is further configured to identify restricted available free parking spaces unassociated with any parking meter, and to transmit only to users of the mobile application who have a user status qualifying them to park in such restricted available free parking spaces unassociated with any parking meter, information that a restricted available free parking space unassociated with any parking meter is available.

7. The system of claim 6, wherein the user status is selected from the group consisting of users who are: members of the mobile application, handicapped, hospital patients, expectant mothers, emergency vehicle operators, medical personnel, or law enforcement personnel.

8. The system of claim 7, wherein the system is further configured to identify whether a user of an automotive vehicle parked in a restricted free parking space unassociated with any parking meter has a user status to permit that user to occupy that space, and if not, to communicate to the remote dynamic database a parking violation by such user.

9. The system of claim 1, wherein the priority is based on factors consisting of: (1) proximity of the second user to the free parking space unassociated with any parking meter, (2) length of time the second user has been searching for a parking space, and (3) length of time the second user intends to remain parked in the free parking space unassociated with any parking meter, and the factors are used to create a proximity score to determine relative priority according to a relationship: priority score=100×[length of time searching for a parking space (minutes)]/[proximity to closest available parking space (feet)+10×length of time the second user intends to remain parked in the free parking space (minutes)].

10. A method comprising:
receiving, from a first communication device associated with a first user of a mobile application associated with a plurality of users, information indicating a location of the first user and that the first user has vacated, or is about to vacate, from the location, a free parking space unassociated with any parking meter;
transmitting, based on a priority, to a second communication device associated with a second user of the plurality of users, information indicating that the free parking space unassociated with any parking meter is about to become, or has become, available, wherein the priority is based on factors comprising all of: (1) proximity of the second user to the free parking space unassociated with any parking meter, (2) length of time the second user has been searching for a parking space, and (3) length of time the second user intends to remain parked in the free parking space unassociated with any parking meter;
transmitting information comprising the location of, or directions to, the free parking space unassociated with any parking meter to the second communication device associated with the second user;
receiving, from the second user, information indicating that the second user intends to occupy, or has occupied, the free parking space unassociated with any parking meter; and
updating a remote dynamic database to reflect that the free parking space unassociated with any parking meter has been taken, and is no longer available.

11. The method of claim 10, wherein the mobile application is associated with a mobile device associated with an automotive vehicle or the first communication device of the first user.

12. The method of claim 11, wherein the mobile device is selected from a group consisting of a factory-installed device installed in the automotive vehicle, an after-market device installed in the automotive vehicle, a smart phone, and a heads-up display.

13. The method of claim 10, wherein the second communication device is configured to determine, based on instructions received from the remote dynamic database, the location of the free parking space unassociated with any parking meter.

14. The method of claim 10, wherein each user of the mobile app is required to consent, as a condition of gaining access to and use of the mobile application, to the transmission of information comprising the location of, or directions to, the free parking space unassociated with any parking meter that the user is about to vacate, or has vacated, to other users of the mobile application.

15. A non-transitory computer readable storage medium storing instructions that, when executed by a processor, cause the processor to perform operations comprising:
receiving, from a first communication device associated with a first user of a mobile application associated with a plurality of users, information indicative of a location of the first user, and that the first user has vacated, or is about to vacate, from the location, a free parking space unassociated with any parking meter;
transmitting, based on a priority, to a second communication device associated with a second user of the plurality of users, information indicating that the free parking space unassociated with any parking meter is about to become, or has become, available, wherein the priority is based on factors comprising all of: (1) proximity of the second user to the free parking space unassociated with any parking meter, (2) length of time the second user has been searching for a parking space, and (3) length of time the second user intends to remain parked in the free parking space unassociated with any parking meter;
transmitting information comprising the location of, or directions to, the free parking space unassociated with any parking meter to the second communication device associated with the second user;
receiving, from the second user, information indicating that the second user intends to occupy, or has occupied, the free parking space unassociated with any parking meter; and
updating a remote dynamic database to reflect that the free parking space unassociated with any parking meter has been taken, and is no longer available.

16. The non-transitory computer readable storage medium of claim 15, wherein the mobile application is associated with a mobile device associated with an automotive vehicle or the first communication device of the first user.

17. The non-transitory computer readable storage medium of claim 16, wherein the mobile device is selected from a group consisting of a factory-installed device installed in the automotive vehicle, an after-market device installed in the automotive vehicle, a smart phone, and a heads-up display.

18. The non-transitory computer readable storage medium of claim 15, wherein the second communication device is configured to determine, based on instructions received from the remote dynamic database, the location of the free parking space unassociated with any parking meter.

19. The non-transitory computer readable storage medium of claim 15, wherein the operations further comprise initiating a query intended for the second user inquiring if the second user desires to take the free parking space unassociated with any parking meter.

\* \* \* \* \*